Patented Mar. 24, 1936

2,035,241

UNITED STATES PATENT OFFICE 2,035,241

BONDING

J. Showles MacLean, Toledo, Ohio, assignor to Solder-Seal Corporation, Toledo, Ohio, a corporation of Ohio No Drawing. Application August 5, 1931,
Serial No. 555,388

1 Claim. (Cl. 75—175)

This invention relates to establishing holding or anchoring relation between solids.

This invention has utility when incorporated for effecting adherent union between similar or dissimilar rigid substances even of metallic or vitreous character.

In carrying out the invention herein an agent is employed which is more readily fusible than the solid with which it is to be engaged; or than the solids between which it is employed as a bond or seal. A type of this agent which has proven effective is of general metallic body, comprising one part lead, two parts tin, approximately, to which is added up to about 5% by weight of zinc of commercial purity. Into this melt is stirred borax up to approaching saturation of the salt, or rather discontinuance of ready fusion thereinto. A satisfactory product has been obtained when the borax has been added, say 1% by weight of the lead-tin-zinc alloy. A crusty porous slag, from this treatment, is skimmed off. The borax treated alloy residue is then cast into bars or rods, as may be desirable for reuse. This alloy in an instance of analysis tested out lead 27.09%, tin 59.03%, zinc 3.61%, and trace only of sodium and boron. From this test it would seem the borax has purified the melt but more at the expense of the zinc in a homogeneous internal readjustment.

More satisfactory results are obtained when the substance to be engaged by this body is stable in the range of the fusion temperature for the lead-tin-zinc agent or alloy. An instance of carrying out bonding hereunder may be taken with polished plate glass. In the vicinity on the plate glass where it is desired to effect binding action, local heating is had to a point at which there may be checked too-rapid temperature drop for the alloy. This is determined as a heating which will allow the fused alloy to be spread as a film and maintain a degree of fluidity. This freedom for ready flowing is desirably obtained by maintaining a temperature quite a few degrees above fusion for laying the film.

In practice over this cleansed surface the alloy is intimately spread by the rubbing of alloy-coated fibers. The flexible termini of a wire brush, even of steel or brass wire, alloy-coated and warm to hold the fused alloy, moved gently or vigorously over the surface, brings about such fine spreading, that in the instance of transparent glass, viewing from the reverse side approaches mirror-like reflection. The polished surface is not cut but the scratching of the brush in the readily fluid mass of the film results in the film flowing into the wake of the brush fibers for most intimate association. This distributed association, due to the mechanical treatment, eliminates formation of clots, flakes, or bubbles, which might, if present, be a source of bond weakness.

The temperature to which the glass is heated is below that which has any tendency to weaken the glass or disturb the properties imparted thereto by annealing or other treatment for strength, reducing frangibility, coloring, etc. The metallic skin imparted by this alloy may be built up into a thickness or design as desired. It may be left as an electrode or electric terminal. A companion piece of plate glass may be similarly treated and the two films brought into firm abutting relation before the temperature of either has dropped, or while there is an approach to the fusing temperature for the bond effecting alloy, and the two pieces of glass as thus held may be allowed to come to normal temperature. Should the films, or either thereof, have become chilled, a temperature rise may be imparted—a so-called sweating, together with firm holding or clamping to bring about the effective bonding.

The resulting product is one of substantial union. The exercise of care against sudden extreme temperature change for the glass has maintained the initial strength thereof. With a pair of highly polished surfaces in parallelism, assembled with the film bond of the alloy, there is but scant quantity of metal present. Subjection of the joint to stresses of sheer or tension, discloses the bond to be stronger than the substances bonded, in the great majority of instances of such test. These tests are not of concussion or shock, which might tend to react against the glass, but have been with the force gradually built up. The metal holds and fragments of the glass are pulled away from one or the other of the glass plates. Instead of working with polished surfaces of plate glass, repairs have been effected along the irregular line of a glass fracture. These surfaces, of course, have complementary identity.

It is desirable that the surface to be acted upon not only be cleansed, but there be absence of organic matter, especially in proximity for the body or vapors to react. However, in this regard, substantial sealing of ply-glass has been attained with the pyroxyline, or intermediate ply within approximately $\frac{1}{16}''$ of the edge which has been bridged by the bonding agent. This peripheral sealing-in of ply-glass is practically effected by a continuous joint process. A progressive local heating, by a fine flame or electrically, may be followed by a rotary alloy-applying warm alloy-coated wire brush or brushes. At a speed of several feet per minute, the sealing-in is practical against any vapor generation from heat reacting upon the cellulose or other cushioning agent between the layers of the glass. This bonding is a metallic layer between the spaced plies.

Bonding between the plies of laminated glass having a shallow cut back has been effected by warming the edges at the channel and thrusting, with a warm tool or agent-coated roller, an agent-coated metal strip into the channel. The channel may be $\frac{1}{32}''$ deep and .015" wide. The metal strip or ribbon may be .010" or less thick but coated to say .019". The temperature is sufficiently high to melt the bonding agent to produce a strengthening waterproof sealed edge. This may be dressed down as desired by grinding.

The wiping action of the wire brush brings about an intimate spreading, with absorption or otherwise, effecting elimination of any bubbles or local reaction, which might be construed to arise from entrained or occluded gases. At least, after the brushing, there is seemingly possible a greater spread with less metal. The brushing or wiping may be in one direction or in intersecting directions. This action is believed to be superficial, that is, entirely local to the metallic film, for upon clearing away the film there does not seem to have resulted any attack by the bonding agent upon the polished face of the glass.

Under these circumstances, it is believed proper to construe that the alloy possesses self-fluxing properties. The boron constituent seems to be of greater importance than the sodium. This fluxing or readjusted agent in the salt is of acid attributes, but is very weakly acid. Instead of the salt, boric acid has been used, but for convenience in use and seemingly better, or at least as good results follow from the use of borax under the manipulations herein adopted.

Art glass assembled under this invention, besides added strength and holding against vibration, is water and weather proof. Instead of the assembly as another body, the bonding may be of the agent to a body, heretofore discussed as electrode mounting, but also as a skin or coating, say for thermal vessels, where it may be given a coating, even a plating of metal, as copper and nickel.

The field of this bonding effectiveness has been specifically discussed in connection with plate glass. The assembly has been found effective on and between portions or articles of pressed or blown ware, and for widely differing glass: lime, soda, potash, lead and the special types of glass for high temperature strength and passing of ultra-violet rays. Furthermore, glazed objects, such as tile, have been assembled, even at the glazed surface portions by the bonding herein disclosed. Flat head sections and bolts are substantially anchored on enameled or glazed surfaces. Inter-assembly between tile and glass and the differing characters of glass are effective up to the normal strength limit of the weaker substance of the joint.

Carrying forward of the same procedure has enabled applicant to operate successfully, not only in curing defects in so-called white metal castings and objects, but to effect repair. The bond is comparable in strength with the metal body so joined. Besides this particular field in the less hard substances, the hard aluminum alloys have been treated with the bonding manipulation and alloy hereunder with resulting strength checking superior to rivet assembly. Furthermore, in aerial navigation structures there is ready practice for skin continuity of the metallic surface of the bonding to bridge the joints. This is a factor in reducing wind resistance.

This alloy may be used as a solder and be worked off of a bar or rod with a soldering tool, in solder operations. The soldering tool has its heated terminus "tinned" with the alloy. For increased practical bonding strength, after adopting usual soldering practice with this special alloy, the brush wiping may be included. However, the special fields made available by the alloy and practices, are peculiarly apart from simple soldering. Glass or other vitreous blocks may be assembled, even into a building. Electric terminals may be sealed thru enameled walls, say in refrigeration units.

What is claimed and it is desired to secure by Letters Patent is:

A tin-lead-zinc metallic bonding medium of vitreous inter-body adhering property, consisting of approximately two parts tin, one part lead, and zinc up to five per cent thereof by weight, and including saturation of the medium melt, said saturation being provided by borax or boric acid.

J. SHOWLES MacLEAN.